United States Patent
Katayama

(10) Patent No.: US 7,554,580 B2
(45) Date of Patent: Jun. 30, 2009

(54) DIGITAL CAMCORDER FOR RECORDING VIDEO DATA ON AN OPTICAL DISK

(75) Inventor: Tatsushi Katayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 11/559,614

(22) Filed: Nov. 14, 2006

(65) Prior Publication Data

US 2007/0126890 A1    Jun. 7, 2007

(30) Foreign Application Priority Data

Nov. 17, 2005    (JP) ............................... 2005-332805

(51) Int. Cl.
*H04N 5/76* (2006.01)
*G11B 21/02* (2006.01)

(52) U.S. Cl. ...................... 348/231.99; 360/75; 386/45; 386/46; 386/125; 386/126

(58) Field of Classification Search ............ 348/231.99, 348/231, 220.1; 360/75; 386/125, 126, 45, 386/46

See application file for complete search history.

(56) References Cited

U.S. PATENT DOCUMENTS

| | | | |
|---|---|---|---|
| 6,141,036 A | 10/2000 | Katayama et al. | ............. 648/47 |
| 6,788,341 B2 * | 9/2004 | Tsunoda et al. | .......... 348/231.1 |
| 7,006,421 B2 | 2/2006 | Katayama | ................ 369/59.22 |
| 7,116,620 B2 | 10/2006 | Minabe et al. | ........... 369/53.27 |
| 2003/0227847 A1 * | 12/2003 | Minabe et al. | ........... 369/53.27 |
| 2004/0114485 A1 * | 6/2004 | Maekawa | ................ 369/53.24 |

FOREIGN PATENT DOCUMENTS

| | | |
|---|---|---|
| JP | 2001-210002 | 8/2001 |
| JP | 2003-317389 | 11/2003 |

* cited by examiner

*Primary Examiner*—Sam Chuan Yao
*Assistant Examiner*—Yih-Sien Kao
(74) *Attorney, Agent, or Firm*—Fitzpatrick, Cella, Harper & Scinto

(57) ABSTRACT

Provided is a digital camcorder, in which it is detected whether a disk is an unused disk or a used disk, and a timing for starting image taking is set for each of a case of the unused disk and a case of the used disk, respectively. The timing for starting image taking is notified to a user through voice, a display of a message, or the like.

10 Claims, 11 Drawing Sheets

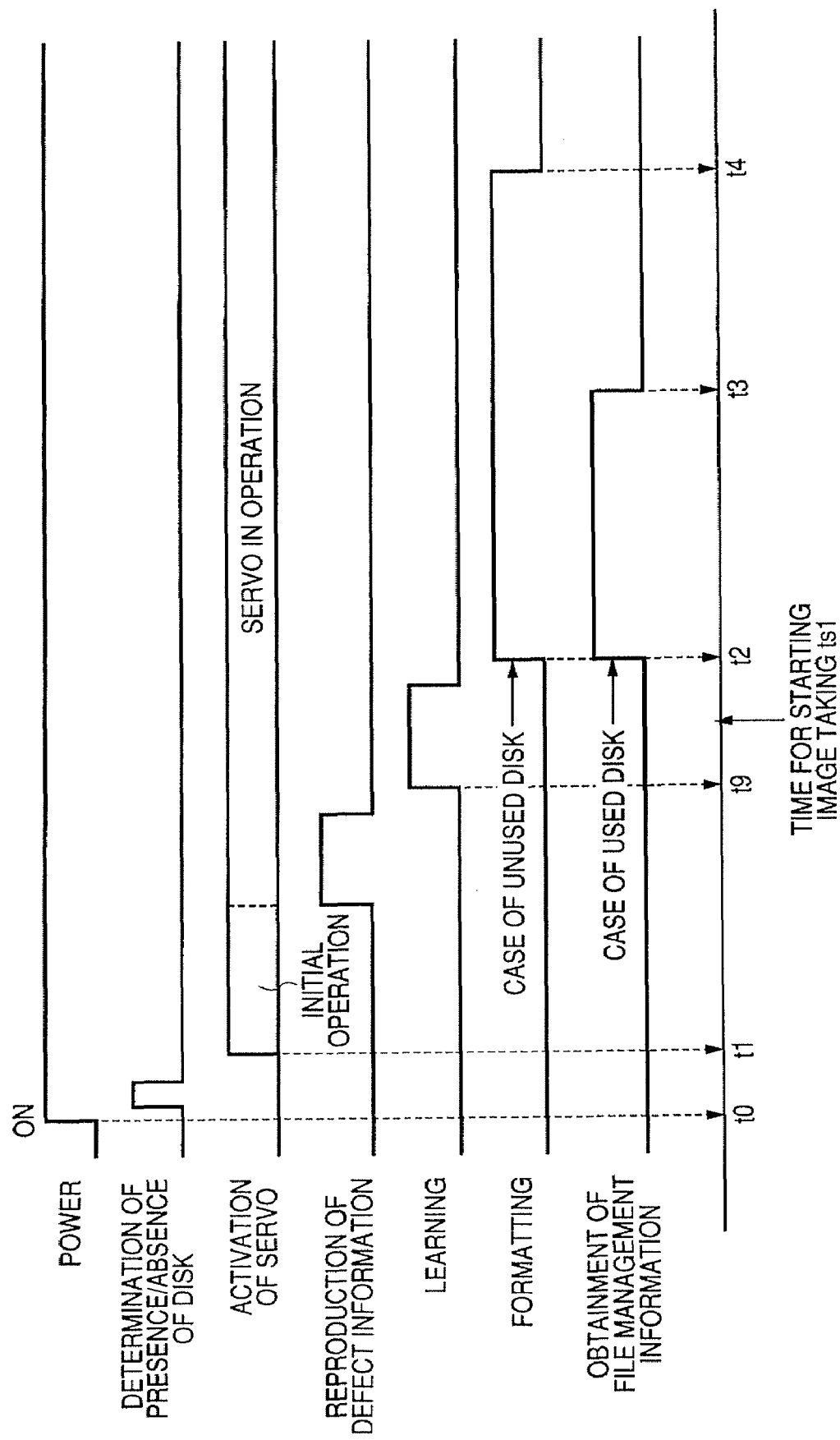

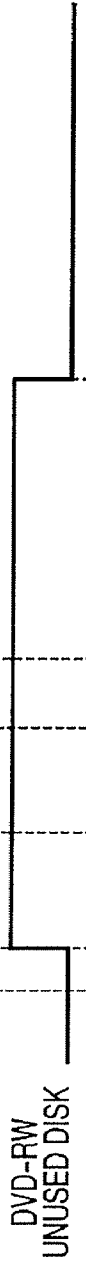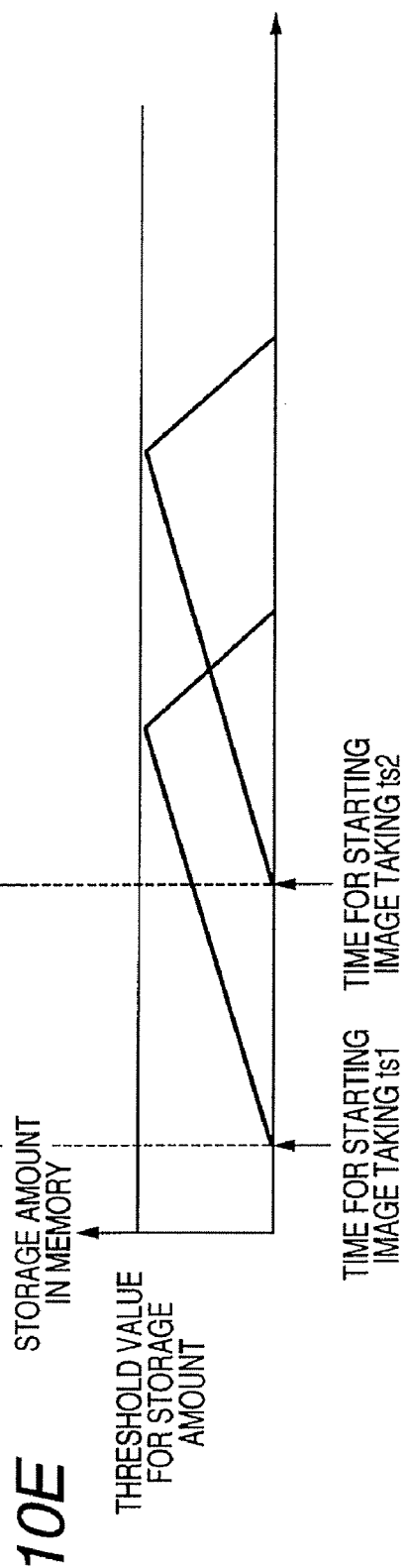
FIG. 10A DVD-R USED DISK
FIG. 10B DVD-RW USED DISK
FIG. 10C DVD-R UNUSED DISK
FIG. 10D DVD-RW UNUSED DISK
FIG. 10E STORAGE AMOUNT IN MEMORY

DIGITAL CAMCORDER FOR RECORDING VIDEO DATA ON AN OPTICAL DISK

BACKGROUND OF THE INVENTION

1. Field of the Invention

The present invention relates to a digital camcorder for recording or reproducing information by using a recording medium such as an optical disk or a magneto-optical disk.

2. Description of the Related Art

Hitherto, there has been proposed a device capable of reducing a waiting time until a disk as a recording medium becomes ready for recording after the power is turned on. For example, Japanese Patent Application Laid-Open No. 2001-210002 discloses a device including a semiconductor memory for storing data, in which data is first stored in the memory after the power is turned on, and the data stored in the memory is read out and recorded on a disk after a disk recording means has become ready for recording data on the disk.

In such the device, since data is temporarily stored in the memory after the power is turned on, it is possible to reduce a waiting time until the disk becomes ready for recording.

The timing of start of storage on the memory is such that immediately after an electric circuit system on the camera side has become ready for operation, a storageable flag is set to "H" to start storing data in the memory. Upon completion of preparation process for the disk recording means (activation of a motor; pull-in of focus servo and tracking servo; access; automatic adjustment; disk type discrimination, and so on), recording on the disk is started.

Further, it is also disclosed therein that storage of data on the memory may be started only after a predetermined period of waiting time has elapsed after the storageable flag has become "H".

Japanese Patent Application Laid-Open No. 2001-210002 further discloses a method for always storing and recording the latest data on the recording medium by writing the latest data over the existing data which has been already stored in the memory, in the case where it takes so long time to make the disk ready for recording that it is impossible to store all the data obtained after the start of storage, so as not to break the continuity of the recorded data.

Another conventional example is disclosed, for example, in Japanese Patent Application Laid-Open No. 2003-317389.

Disclosed in Japanese Patent Application Laid-Open No. 2003-317389 is a device in which after the power is turned on, activation of rotation of a disk, light emission with a laser, pull-in of focus servo and tracking servo, and various automatic adjustments of a servo system are performed. Then, the laser power is learned and the disk type is discriminated. Further, information to management of defects in a case of a rewritable disk, information to recordable positions in a case of a write-once disk, or the like is read out. Upon completion of the above startup process, a user is notified that the device is ready for recording. In this state, in response to an instruction given by the user to start recording, the device starts storing image pickup data in a memory through compression coding.

According to the method disclosed in Japanese Patent Application Laid-Open No. 2001-210002, the device starts storing data in the semiconductor memory when the electric system of the camera becomes ready for operation, and the data starts to be recorded on the disk when the disk is made ready for recording.

However, according to such the method, when an unused disk is inserted, it is necessary to detect that the inserted disk is an unused disk and to perform formatting process thereof (initialization of defect information, logical format processing, padding processing on a predetermined area, and the like). Since it takes at least several seconds to perform the formatting process, the period of time until the disk is made ready for recording will be significantly changed.

Accordingly, unless the timing of the start of storage on the memory is set in consideration of the time necessary for the formatting process, the amount of data to be stored may exceed the capacity of the memory before the disk is made ready for recording, depending on the capacity of the memory. As a result, a part of the data which a user expects to be stored may be lost.

Also, according to the method disclosed in Japanese Patent Application Laid-Open No. 2001-210002, data are sequentially stored in the memory, and when the stored data reaches the end of the memory, the oldest data stored at the beginning of the memory is written over by the latest data, to thereby continue storing data so as to always store the latest data. Accordingly, the continuity of the data recorded on the disk is not broken, but the data stored immediately after the start of storage in the memory is not recorded on the disk, with which the user may feel dissatisfied.

According to the method disclosed in Japanese Patent Application Laid-Open No. 2003-317389, a user is notified that the activation of the disk is completed and the disk is ready for recording, and the memory starts storing data in response to the user's instruction. Therefore, in the case of an unused disk, it is possible to start storage in the memory while notifying the user that recording becomes possible after formatting. However, in this case, since the user cannot start image taking until the disk is made ready for recording, the waiting time until starting image taking is significantly increased.

SUMMARY OF THE INVENTION

It is, therefore, an object of the present invention to provide a digital camcorder which can reduce dissatisfaction that a user feels and also reduce a waiting time until starting image taking.

According to an aspect of the present invention, there is provided a digital camcorder comprising: an image pickup sensor; a signal processing circuit for processing an output signal from the image pickup sensor; a memory for storing output data from the signal processing circuit; an optical disk drive for recording the data stored in the memory to an optical disk; a detection circuit for detecting whether an optical disk inserted is an unused disk or not; a setting circuit for setting a timing for starting image taking according to a detection result of the detection circuit; and a notification circuit for notifying the timing for starting image taking.

Further features of the present invention will become apparent from the following description of exemplary embodiments with reference to the attached drawings.

BRIEF DESCRIPTION OF THE DRAWINGS

FIG. 5 is a timing chart for explaining an operation of Embodiment 1.

FIGS. 10A, 10B, 10C, 10D, and 10E are timing charts for explaining an operation of Embodiment 2.

DESCRIPTION OF THE EMBODIMENTS

Hereinafter, a best mode for carrying out the present invention is explained with reference to the accompanying drawings.

Embodiment 1

Figure 1:
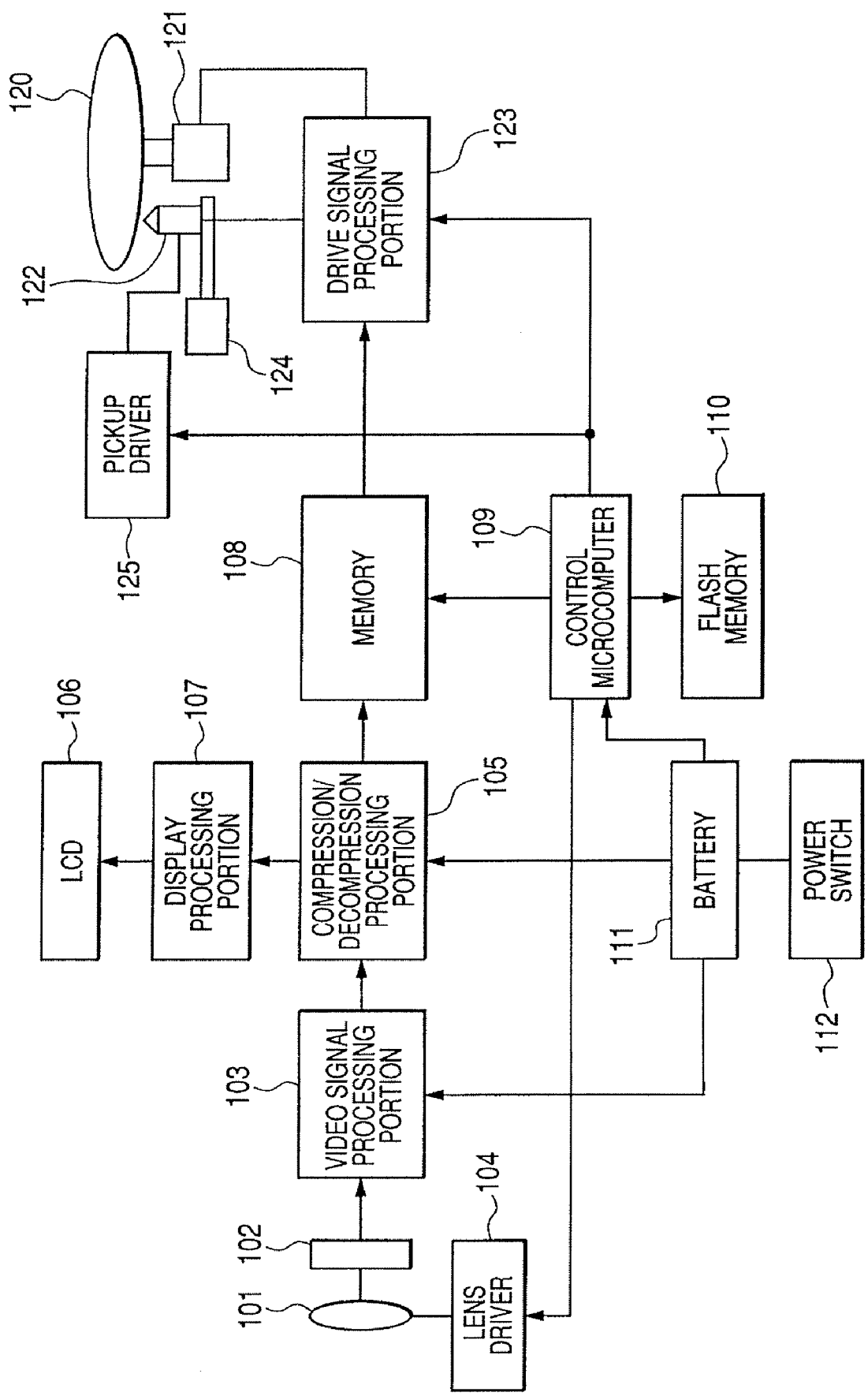
FIG. 1 is a block diagram showing Embodiment 1 of the present invention.

FIG. 1 is a block diagram showing a digital camcorder according to Embodiment 1 of the present invention. In the figure, reference numeral 101 denotes a lens; 102 denotes an image pickup sensor such as a CCD; 103 denotes a video signal processing portion; 104 denotes a lens driver for driving the lens; 105 denotes a compression/decompression processing portion for compressing/decompressing video and audio signals; and 106 denotes an LCD display portion as a display means.

Reference numeral 107 denotes a display processing portion; 108 denotes a memory; 109 denotes a control microcomputer; 110 denotes a flash memory; 111 denotes a battery; 112 denotes a power switch; 120 denotes a disk as an information recording medium; and 121 denotes a spindle motor for rotary-driving the disk 120. Examples of the disk 120 include an optical disk and a magneto-optical disk.

Further, reference numeral 122 denotes a pickup for recording or reproducing a signal to or from the disk 120; 123 denotes a drive signal processing portion for processing a reproduced signal or recorded signal; 124 denotes a forwarding motor for moving the pickup 122 in the radial direction of the disk 120. Reference numeral 125 denotes a pickup driver for performing focus and tracking control of the pickup 122 and also for driving a semiconductor laser included in the pickup 122. The spindle motor 121, the pickup 122, the drive signal processing portion 123, the forwarding motor 124, and the pickup driver 125 together constitute an optical disk drive. Incidentally, in FIG. 1, a microphone for collecting sounds, a circuit for processing sounds, and the like are not illustrated.

In image taking, an object image is imaged through the lens 101 on the image pickup sensor 102 and subjected to photoelectric conversion in the image pickup sensor 102. An electric signal obtained by the photoelectric conversion in the image pickup sensor 102 is converted into a video signal by the video signal processing portion 103. The video signal is supplied to the compression/decompression processing portion 105 and converted into a video compression digital signal. As the compression system, known technologies such as JPEG system and MPEG system can be used for handling still image and moving image, respectively. The video signal is displayed on the LCD display portion 106 through the display processing portion 107.

The compressed video signals are sequentially stored in the memory 108, and when the video signals stored in the memory 108 are to be recorded on the disk 120, firstly the disk 120 is rotary-driven with the spindle motor 121. Then, a focus actuator and a tracking actuator of the pickup 122 are controlled by the pickup driver 125 to perform servo control. After the servo has been properly controlled, the pickup 122 is allowed to seek a position of a recording address as needed, where the pickup 122 waits for the disk 120 to be rotated until a recording start address is reached and then starts recording from a desired recording address.

In general, as compared with the rate at which video data is transferred to the memory 108, the rate at which the data is recorded on the disk 120 from the memory 108 is larger. Accordingly, the disk drive can be suspended until the compressed video data stored in the memory 108 reaches a predetermined amount.

Figure 2:
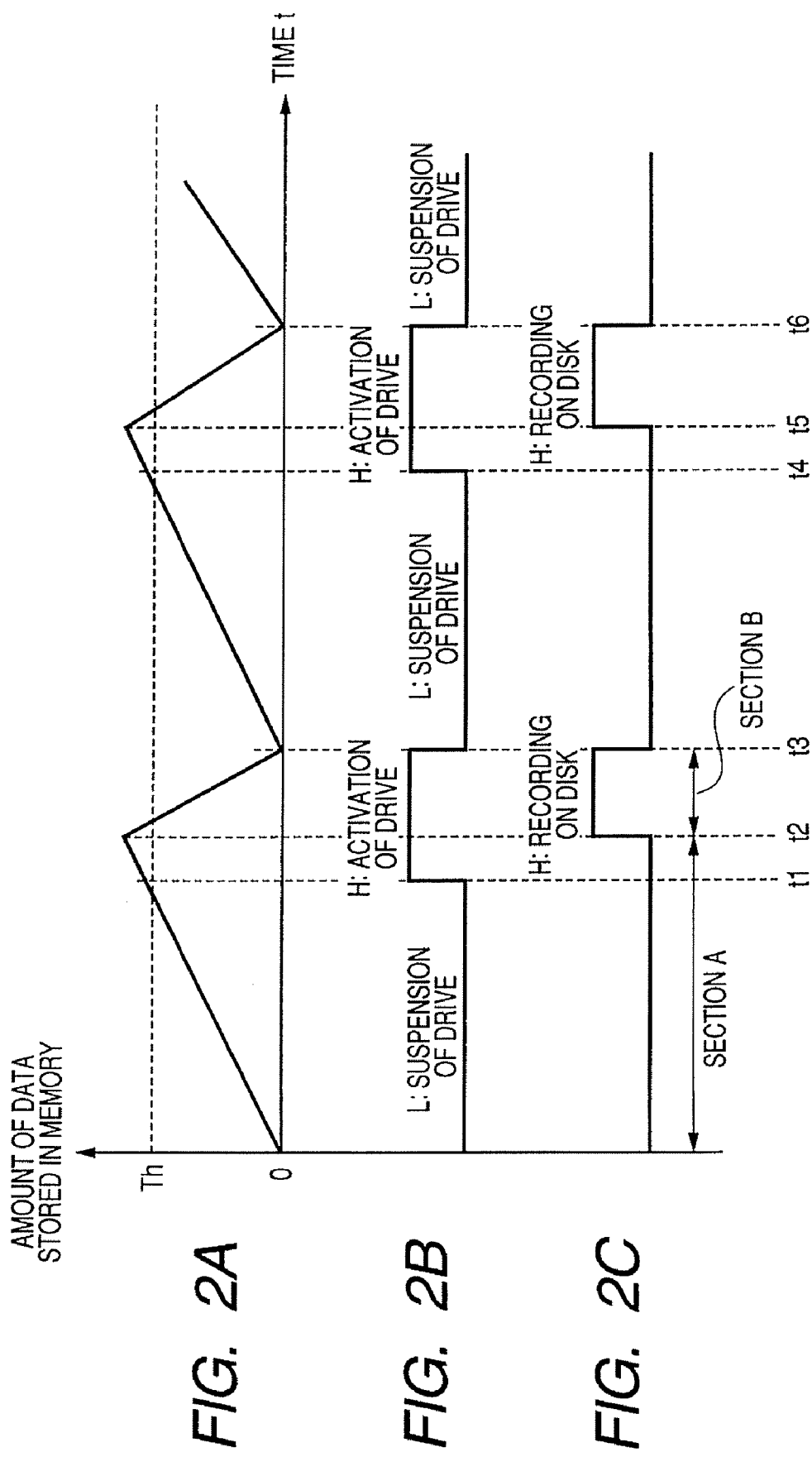
FIGS. 2A, 2B, and 2C are timing charts for explaining intermittent recording.

FIGS. 2A to 2C are schematic diagrams illustrating intermittent recording. FIG. 2A shows the amount of data stored in the memory 108, FIG. 2B shows a control signal for suspending/activating the disk drive, and FIG. 2C shows a control signal for controlling recording timing. In order to perform intermittent operation, a threshold value "Th" is set with respect to the amount of data stored in the memory 108. During the image taking, data is accumulated in the memory 108 at a predetermined transfer rate, and at the time instant (hereinafter, sometimes simply referred to as "time") "t1" when the amount of data stored in the memory 108 reaches the threshold value "Th", the disk drive is activated to control the servo so as to seek a predetermined track.

When the seek is completed, recording is started at the time "t2" to record data stored in the memory 108 on the disk 120, and the disk drive is suspended again at the time "t3". Specifically, for example, the spindle motor 121 is stopped so as to stop the rotation of the disk 120, or the servo control is stopped to turn off laser light, thereby reducing power consumption of the disk drive. In the manner as described above, the disk drive is alternately suspended and activated to perform recording.

Figure 3:
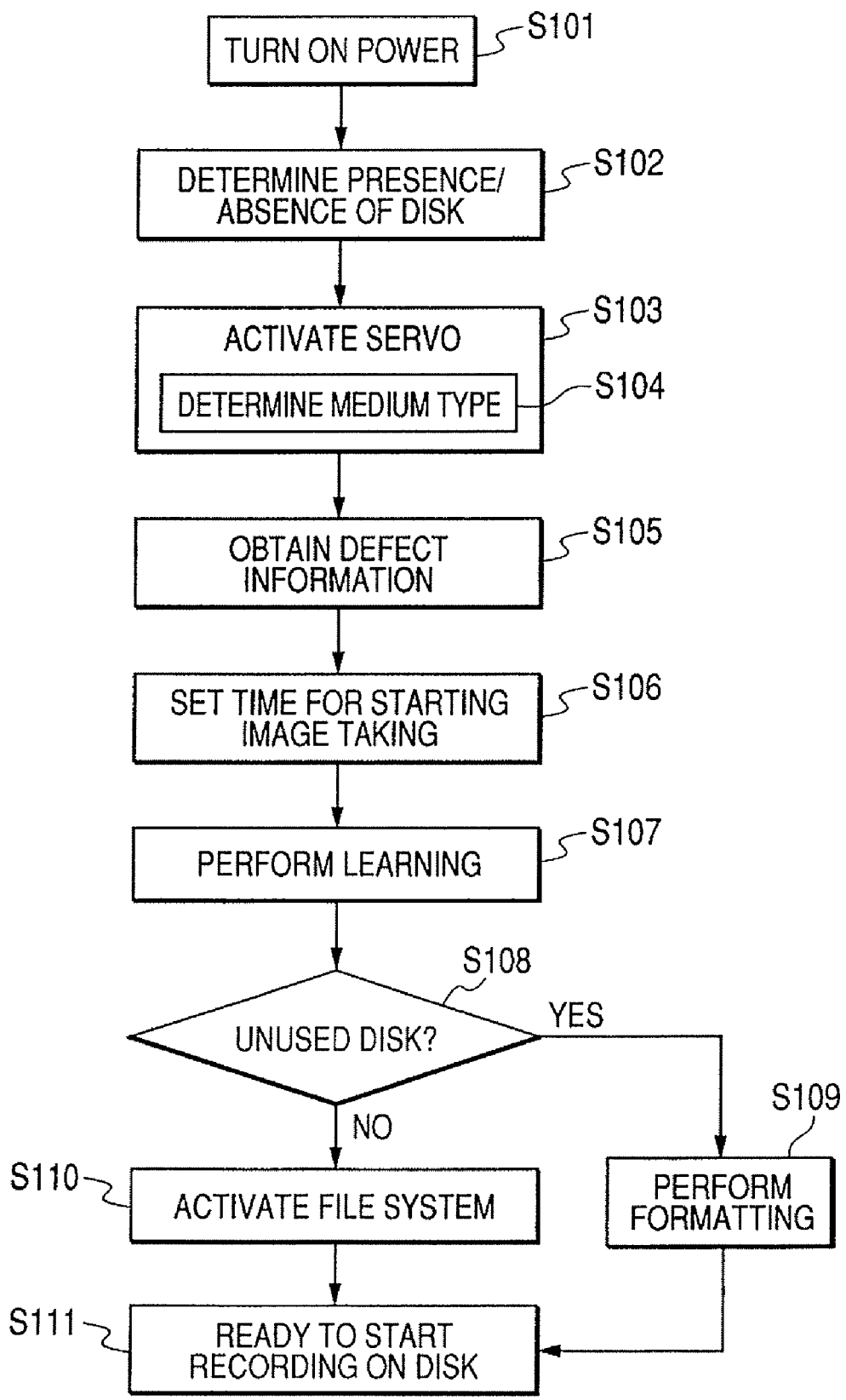
FIG. 3 is a flowchart for explaining an operation of Embodiment 1.

FIG. 3 shows a flowchart of a startup sequence according to the present invention. The following process is performed by the control microcomputer 109. First, in S101, the user turns on the power switch 112 so that power is supplied from the battery 111 to each part of the device to initialize the circuit.

Next, in S102, a determination is made as to whether or not the disk 120 is inserted in the device. The determination is made, for example, such that a light beam is irradiated by the pickup 122, and when the amount of reflected light exceeds a predetermined value, it is judged that the disk 120 is inserted.

Then, in S103, activation process for a servo is performed by the following procedure. First, the spindle motor 121 is rotary-driven, and when the rotation frequency reaches a predetermined value, a semiconductor laser in the pickup 122 is turned on. After that, a focus servo is activated, and when the focus servo is confirmed to operate normally, a tracking servo is activated.

In S104 of this servo activation process, the type of the disk 120 is determined. The determination regarding the type of medium can be made based on, for example, the amplitude of a light reflected by the disk 120 at a time of focus pull-in operation, the amplitude of a tracking traverse signal, or the like.

Examples of the recording medium include DVD-R and DVD-RW. Since plural types of media including the above-mentioned are used in one digital camcorder, the type of the medium needs to be detected in advance. For example, a servo control parameter, a signal processing circuit, or the like may be changed depending on which of the DVD-R and DVD-RW is used. The processing corresponding to the type of the medium is well known, and therefore a detailed explanation therefor is omitted. At this point of time, reproduction process of signals suitable for the type of the medium is ready to be performed.

Next, in S105, defect information is obtained. The term "defect information" herein employed refers to information in which positions of defects on a medium and replacement positions for the defects are recorded. This information is arranged on the track position defined by the specification of the disk or the like, and read out by the pickup 122 sought to the position.

In reading out the defect information, if the disk 120 is an unused disk, the disk does not have the defect information recorded on the predetermined track position. Therefore, by monitoring the amplitude of reproduced signals for a predetermined period of time from the position where the readout of the defect information is started, it is possible to determine whether the disk is an unused disk or not.

Here, the term "unused disk" employed herein refers to one which is not formatted. Also, the term "used disk" refers to one which is already formatted.

Figure 4A:
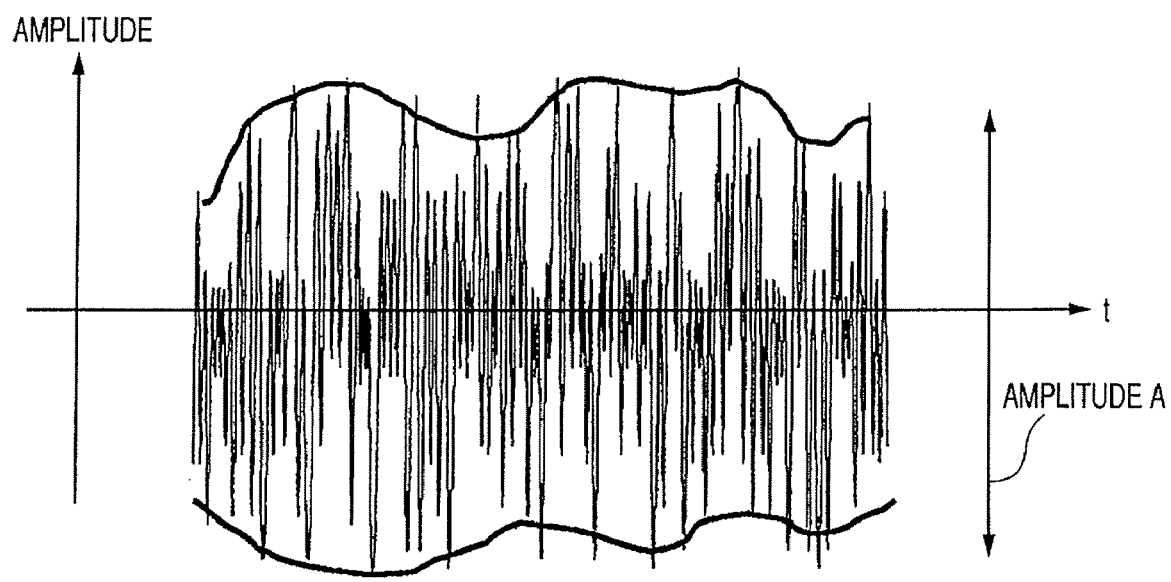
FIGS. 4A and 4B are graphical representations for explaining a method of judging whether a disk is an unused disk or a used disk.
Figure 4B:
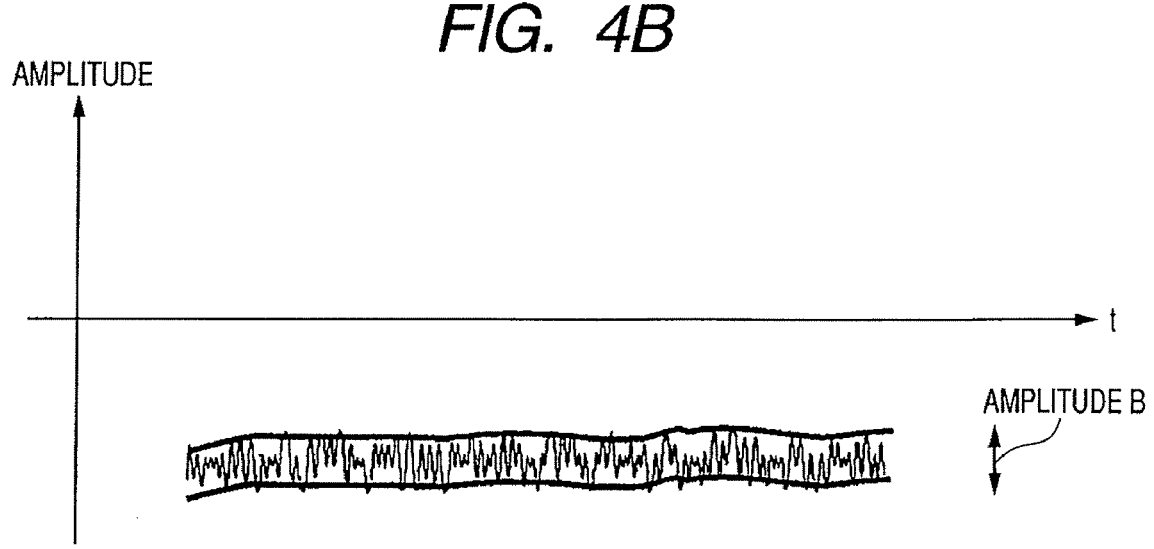

FIGS. 4A and 4B show reproduced signals obtained from a used disk and an unused disk, respectively, when the defect information is read out from a disk. FIG. 4A shows a case of a reproduced signal obtained from the used disk, and FIG. 4B shows a case of a reproduced signal obtained from the unused disk. The reproduced signal obtained from the used disk has a predetermined amplitude such as represented by amplitude "A" in FIG. 4A, while the reproduced signal obtained from the unused disk has a significantly small amplitude such as represented by amplitude "B" in FIG. 4B. Therefore, it is possible to determine whether the disk is an unused disk or not by subjecting reproduced signals to envelope detection to obtain an amplitude and comparing the obtained amplitude with a predetermined threshold value.

In FIG. 1, the drive signal processing portion 123 or the like is controlled to read out data of a track which holds the defect information, and the reproduced signal is subjected to envelope detection as described above at an envelope detection circuit (not shown) to obtain the amplitude of the signal. The amplitude is compared with a predetermined threshold value at the control microcomputer 109 to thereby determine whether the disk is an unused disk or not.

Alternatively, it is possible to adopt another method for determining whether the disk is an unused disk or not. According to the method, the head position of a user data area of the disk is reproduced, and the reproduced data is subjected to ECC processing at the drive signal processing portion 123. If the result of the ECC processing is an error, the reproduction is repeated for predetermined times. If the result is still an error after the repeated reproduction, it is determined that the disk is an unused disk.

Next, in S106, the time (timing) at which image taking can be started. In S106, the timing at which image taking can be started is selectively set in accordance with the disk type, that is, depending on whether the disk is an unused disk or a used disk, as described later. This process is described in detail later.

Next, in S107, a learning process is performed to determine the optimal value for the recording power or the like for recording data on the disk 120. In this process, the recording is performed on a test area of the disk 120 while stepwise changing parameters for adjusting the recording power, and the reproduced signals are evaluated by using an appropriate evaluation index, to thereby obtain an optimal value. The evaluation index can be formed based on an amplitude value of a reproduced signal or on a likelihood for Viterbi decoding in the case of a reproduction system using PRML (Partial Response Maximum Likelihood).

The parameters obtained from the learning, such as an optimal value for recording power, are stored in the flash memory 110 as needed. Thereby, even when the power switch 112 is turned off, as long as the disk 120 is not replaced, it is possible to obtain an optimal value by reading out data from the flash memory 110, without performing learning.

Next, in S108, it is determined whether the disk 120 is an unused disk or not according to the result of the determination based on the defect information obtained in S105, depending on which the process branches.

The defect information is presented in a table for managing addresses of the defect areas on the disk. The addresses of the defect areas detected during the use of disk is held in the table, and the addresses are recorded at an arbitrary timing on a predetermined management area on the disk. An unused disk does not have such the table recorded, so that it is possible to judge whether the disk is an unused disk or not by detecting the presence/absence of the table.

In the case of an unused disk, the process proceeds to S109, where the disk is subjected to format processing by a file system. In the format processing, management information, space bit map for managing free areas on the disk, or the like is recorded on a predetermined area on the disk 120. In general, when formatting is necessary, it takes several seconds to several tens seconds to complete the operation.

In the case of a used disk, the process proceeds to S110, where the management information recorded on the disk 120 is read out to activate the file system. Upon completion of the above-mentioned process, it is possible to start recording data on the disk 120 in S111.

Here, as explained above with reference to FIGS. 2A to 2C regarding the intermittent operation, the video data obtained by image taking is once stored in the memory 108, and then recorded on the disk 120. Accordingly, in S110 of FIG. 3, by starting to store the video data obtained by the image taking in the memory 108, it becomes possible to reduce a time period from the power turning on by a user to the time at which recording can be started. That is, it is possible for the user to start taking images by pressing a recording button (image taking button or REC button) (not shown) before the recording on the disk actually becomes possible.

FIG. 5 shows a timing chart for indicating a sequence from the power-on to the start of recording on the disk 120. The power is turned on at the time "t0" (S101 of FIG. 3), and it is determined whether or not the disk 120 is inserted (S102). After that, an activation operation for a servo is started at the time "t1" (S103). Upon completion of the initial operation of activation, the defect information is reproduced and learning operation or the like is performed (S105 to S107). Then, it is determined whether the disk 120 is an unused disk or not (S108), and in the case where the disk 120 is the unused disk, the format processing is started at the time "t2" (S109). In the case of the used disk, the file management information is reproduced (S110).

Here, if the disk needs formatting, it takes a time period ranging from the time "t2" to the time "t4" as shown in FIG. 5. On the other hand, when the file management information is read, the operation can be completed within a period of time ranging from the time "t2" to the time "t3". The disk 120 is made capable of recording the user data on and after the time "t4". Therefore, in the case of the unused disk, it takes more time until the recording of the user data is made possible, as compared with the case of the used disk.

Figures 6A, 6B, 6C:
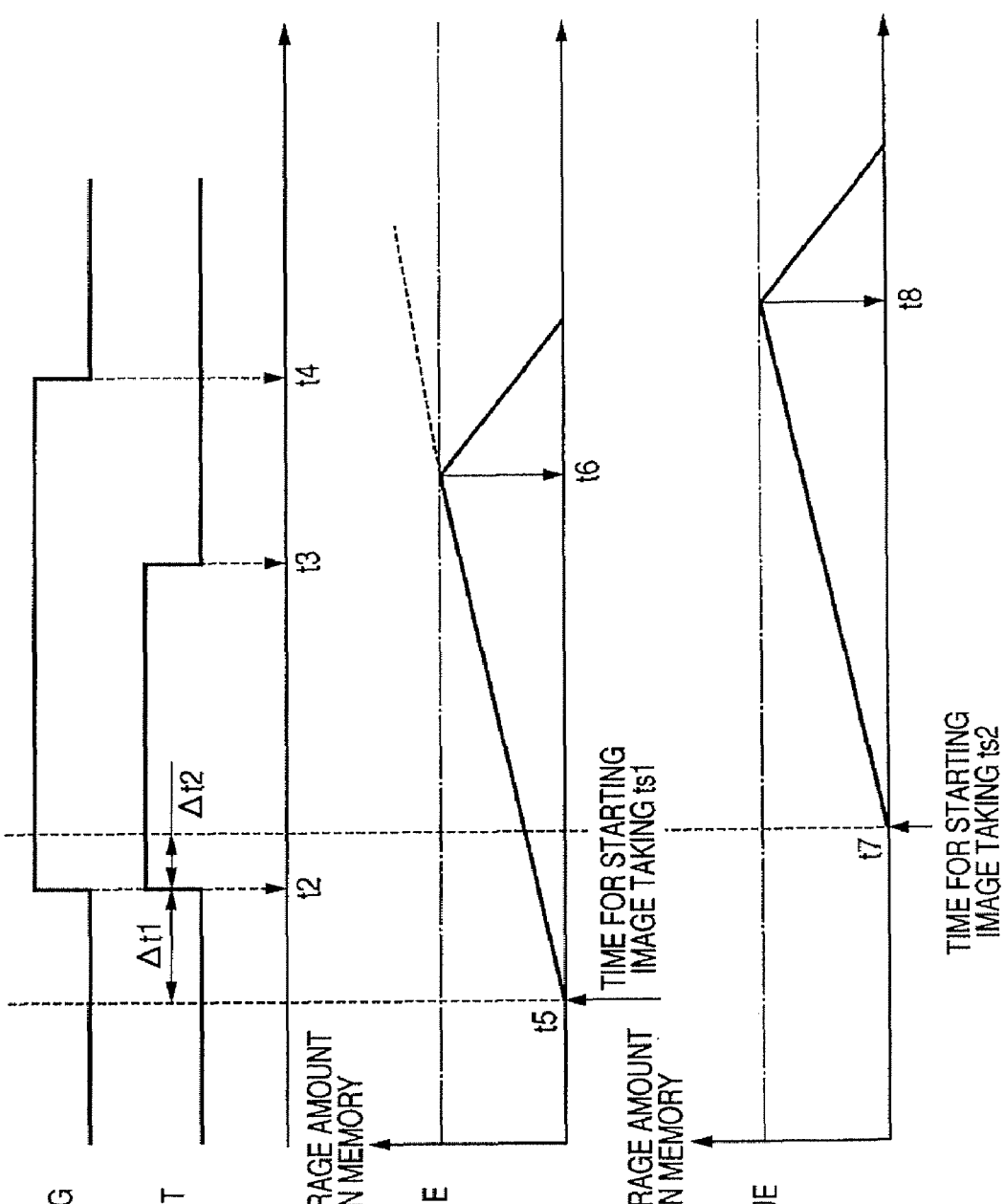
FIGS. 6A, 6B, and 6C are timing charts for explaining a timing at which image taking can be started according to Embodiment 1.

FIG. 6A shows timings in the case of the formatting and the file management information obtainment of FIG. 5. FIG. 6B shows the amount of data stored in the memory in the case where the memory starts storing the video data from the time "t5", and FIG. 6C shows the amount of data stored in the memory in the case where the video data starts to be stored from the time "t7".

As shown in FIG. 6B, when the memory 108 starts the storage at a time prior to the time "t2", the data starts to be recorded on the disk 120 from the time "t6". Accordingly, in the case of the used disk, it is possible to make the disk 108 ready for recording at the time "t3" when the obtainment of the file management information of FIG. 6A is complete, so that the operation can be performed without exceeding the threshold value for the storage amount in the memory.

On the other hand, in the case of the unused disk, as shown in FIG. 6A, it is not until the time "t4" that the format is obtained, and the disk 120 is made ready for recording only after the time "t4". Therefore, if the memory 108 starts storing data from the time "t4", the amount of stored data exceeds the threshold value for the storage amount in the memory to overflow the memory capacity.

Therefore, when formatting is necessary, there is required such a sequence that the storage starts at a time "t7" and the recording on the disk 120 starts at a time "t8" as shown in FIG. 6C. In the present embodiment, the time (timing) at which image taking can be started is set such that even when an unused disk is inserted and formatting is performed, image taking is made possible as early as possible and the data stored in the memory 108 can be recorded on the disk 120 without overflowing.

Explained next is how to set the time at which image taking can be started. First, an explanation is given on a case of an unused disk which requires formatting.

In the intermittent operation, when the capacity of a memory for storing data is represented by "S" and the transfer rate of video data is represented by "Vs", the time period "Tm" during which the upper limit of storage amount in the memory is reached is defined as follows.

$Tm=S/Vs$

For example, when the memory capacity is 10 M bytes and the average transfer rate of the video data is 9 Mbps, the time period "Tm" during which the upper limit of the memory capacity is reached is expressed as follows.

$Tm=80$ Mbit/9 Mbit=about 9 (sec)

Here, the time period "Tf" necessary for the formatting is obtained as Tf=t4−t2 as shown in FIG. 6A. For example, when Tf=10 (sec) is assumed, the difference between the time period "Tm" described above and the time period "Tf" is obtained as about 1 (sec) from Δt2=Tf−Tm. Therefore, if the memory 108 starts storage after the lapse of at least Δt2 from the time "t2" of FIG. 6A, the recording on the disk 120 can be performed without overflowing the memory capacity. Accordingly, a time "ts2" can be set as the time at which image taking can be started as shown in FIG. 6C.

Next, an explanation is given on how to set the time at which image taking can be started in a case of a used disk. In the case of the used disk, the disk is initialized through the obtainment of the management information of a file system recorded on the disk 120. In FIG. 6A, the file management information is obtained during a time period ranging from the time "t2" to the time "t3". The time period necessary for obtaining the file management information is expressed as Ti=t3−t2, and is assumed to be about 6 (sec).

When the memory 108 stores video data under the same condition as described above, it takes Tm=about 9 (sec), and the difference between Tm and Ti is represented by Δt1=Tm−Ti=3 (sec). Incidentally, since the time necessary for obtaining the file management information is shorter than the time necessary for the data amount to reach the upper limit of the memory capacity, it is possible to set the time (or time instant) at which image taking can be started to a time (or time instant) earlier than the time (or time instant) "t2" at which the obtainment of the file management data starts.

Accordingly, as shown in FIG. 6B, the time "ts1", which is earlier than the time "t2" by Δt1, is set as the time at which image taking can be started in the case of the used disk. As a method for setting the time "ts1", the timing after the lapse of a predetermined time from the time "t9" for starting the learning in FIG. 5 may be set as the time "ts1", and a user may be informed that image taking can be started at the time "ts1".

As described above, the determination as to whether the disk 120 is an unused disk or used disk is made when the defect information is reproduced in S105 of FIG. 3 as described above. Therefore, as shown in FIG. 3, the time "ts1" or "ts2" for starting image taking is set in S106 after the determination is made as to whether the disk is unused or used.

More specific explanation is given on how to set the time at which image taking can be started. In the case of the unused disk, an offset time is set based on the format starting time, and in the case of the used disk, the offset time is set based on the learning starting time. Then, when the offset times of the unused disk and the used disk are reached, a message is displayed on the LCD display portion 106 as described later to notify the user that image taking can be started. It is also possible to use a predetermined electronic sound, voice, or the like for notification.

Next, an explanation is given on an interface to be used for notifying the user that image taking can be started. FIGS. 7A to 7D show how the display on the display screen of the LCD display portion 106 of FIG. 1 changes. The user performs an image taking operation while confirming each message displayed in accordance with the operational status of the device.

Figure 7A:
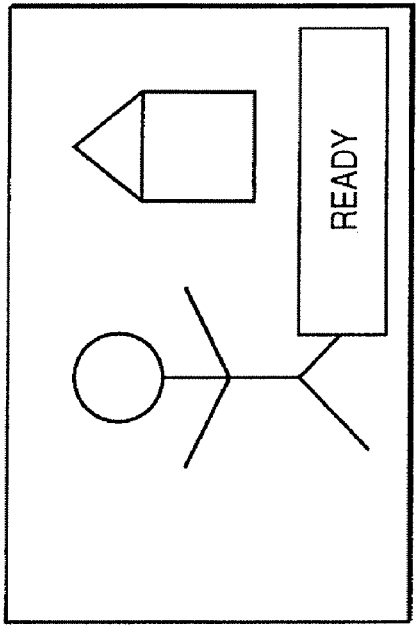
FIGS. 7A, 7B, 7C, and 7D are diagrams showing an example of a message to be displayed on an LCD display portion according to Embodiment 1.
Figure 8A:
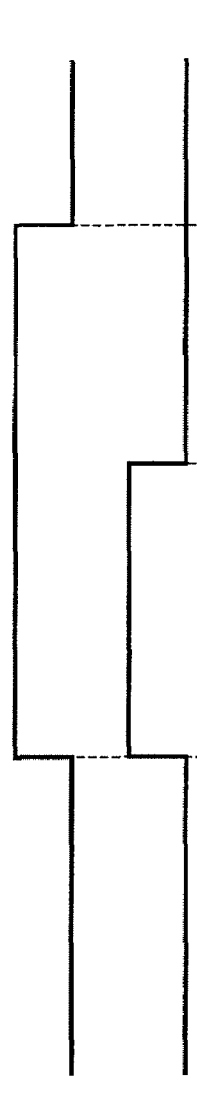
FIGS. 8A, 8B, and 8C are timing charts for explaining an operation performed when an unused disk or a used disk is activated according to Embodiment 1.
Figure 8B:
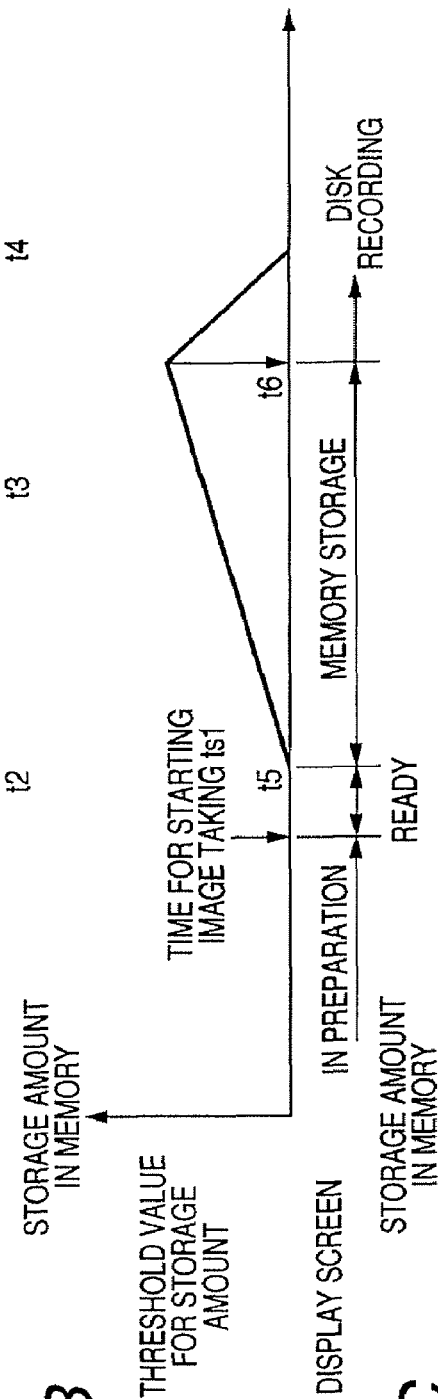
Figure 8C:
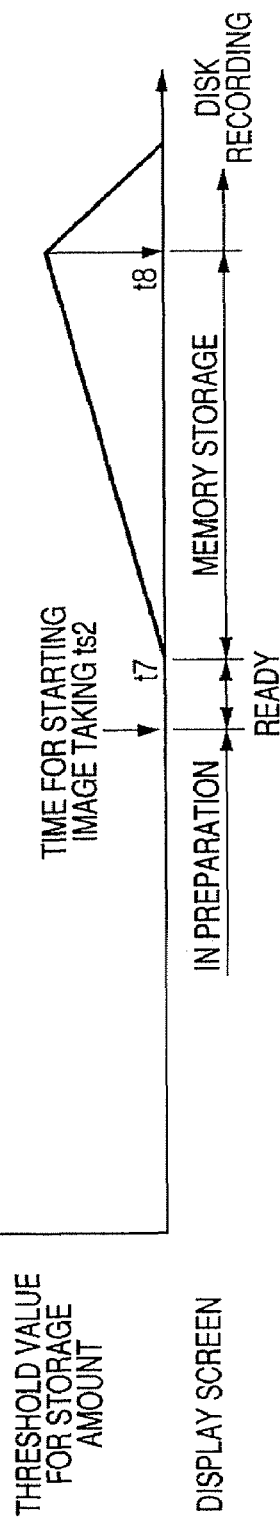

FIGS. 8A to 8C show timing charts for explaining each of the operations for activating an unused disk and a used disk, respectively. The times shown in FIGS. 8A to 8C correspond to the times shown in FIGS. 6A to 6C. In the case of the used disk, as shown in FIG. 8B, the image taking is made possible at the time "ts1", that is, the memory 108 is made ready for storing video data at the time "ts1". Accordingly, during the time period from the power-on to the time "ts1", a message of "in preparation" is superimposed on an image from the camera to be displayed on the LCD display portion 106 as shown in FIG. 7A.

Figure 7B:
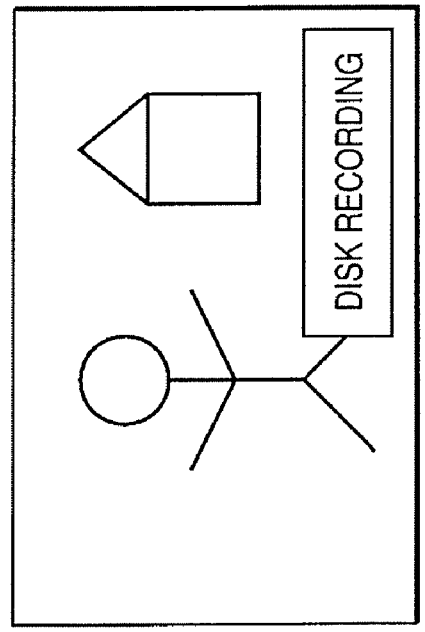
Figure 7C:
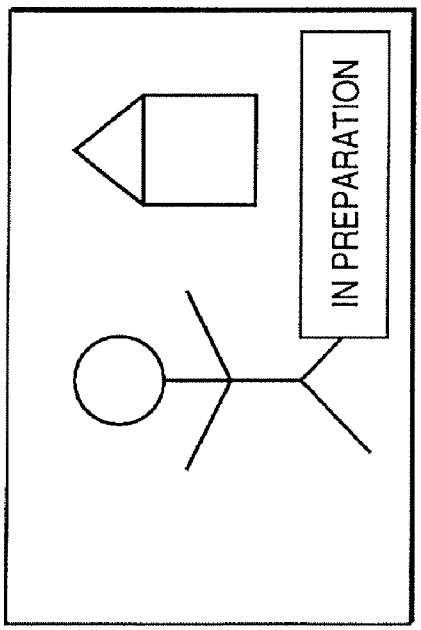

When the time "ts1" at which image taking is made possible, a message of "ready" is displayed on the LCD display portion 106 as shown in FIG. 7B. The user presses a recording button (not shown) to start image taking, and the memory 108 starts storing data from the time "t5" of FIG. 8B. During this time period, a message of "memory storage" is displayed on the screen of the LCD display portion 106 as shown in FIG. 7C.

Figure 7D:
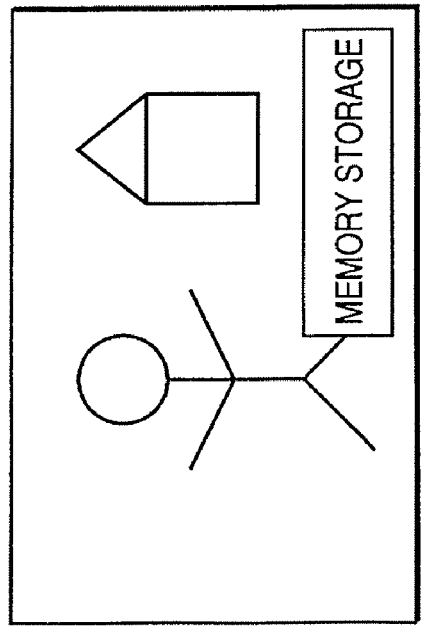

Further, after the obtainment of the file management information is completed at the time "t3" and the disk 120 is made ready for recording, the data starts to be recorded on the disk 120 at the time "t6" when the amount of data stored in the memory 108 reaches the predetermined value. During this time period, a message of "disk recording" is displayed on the LCD display portion 106 as shown in FIG. 7D.

Next, an explanation is given on the case of the unused disk. In the case of the unused disk, the disk needs to be subjected to the format processing first, and therefore it takes more time until the disk is made ready for recording as compared with the case of the used disk.

Formatting of the disk is started at the time "t2" of FIG. 8A, and image taking is made possible at the time "ts2" of FIG. 8C. Accordingly, a message of "in preparation" is displayed on the screen as shown in FIG. 7A until the time "ts2". It is also possible to display a message of "formatting" instead of "in preparation".

When the time "ts2" at which image taking is made possible is reached, a message of "ready" is displayed in turn as shown in FIG. 7B. It is also possible to substitute this message with symbols indicating "REC pause". The user presses a recording button (not shown) at an appropriate timing after confirming the message of "ready", to thereby start image taking at the time "t7".

Image signals obtained through the image taking start to be stored in the memory 108 from the time "t7", and a message of "memory storage" is then displayed in turn as shown in FIG. 7C. At this point of time, however, the format of the disk has not been completed.

When the format is completed at the time "t4", the disk 120 is made ready for recording. In FIG. 8C, however, the amount of data stored is well within the storage capacity of the memory 108, and therefore the data starts to be recorded on the disk 120 from the time "t8". When the disk 120 starts recording the data, a message of "disk recording" is displayed on the LCD display portion 106 as shown in FIG. 7D.

Incidentally, although in this embodiment an example for employing a character string to display a message on the display screen of the LCD display portion 106, it is also possible to use, for example, a picture or a symbol as appropriate, instead of such the character string.

The user can press a recording button (not shown) to start image taking at and after the above-mentioned time at which image taking can be started. Accordingly, the user does not have to wait until the disk 120 is made ready for recording. In addition, all the data obtained after the start of image taking can be recorded on the disk 120 regardless of whether the disk 120 is unused or a used disk.

Also, during the image taking, it is possible to surely know the operational status of the device, so that it is also possible to instantly know whether the video data is being recorded on the disk 120 or being stored in the memory 108.

Embodiment 2

Figure 9:
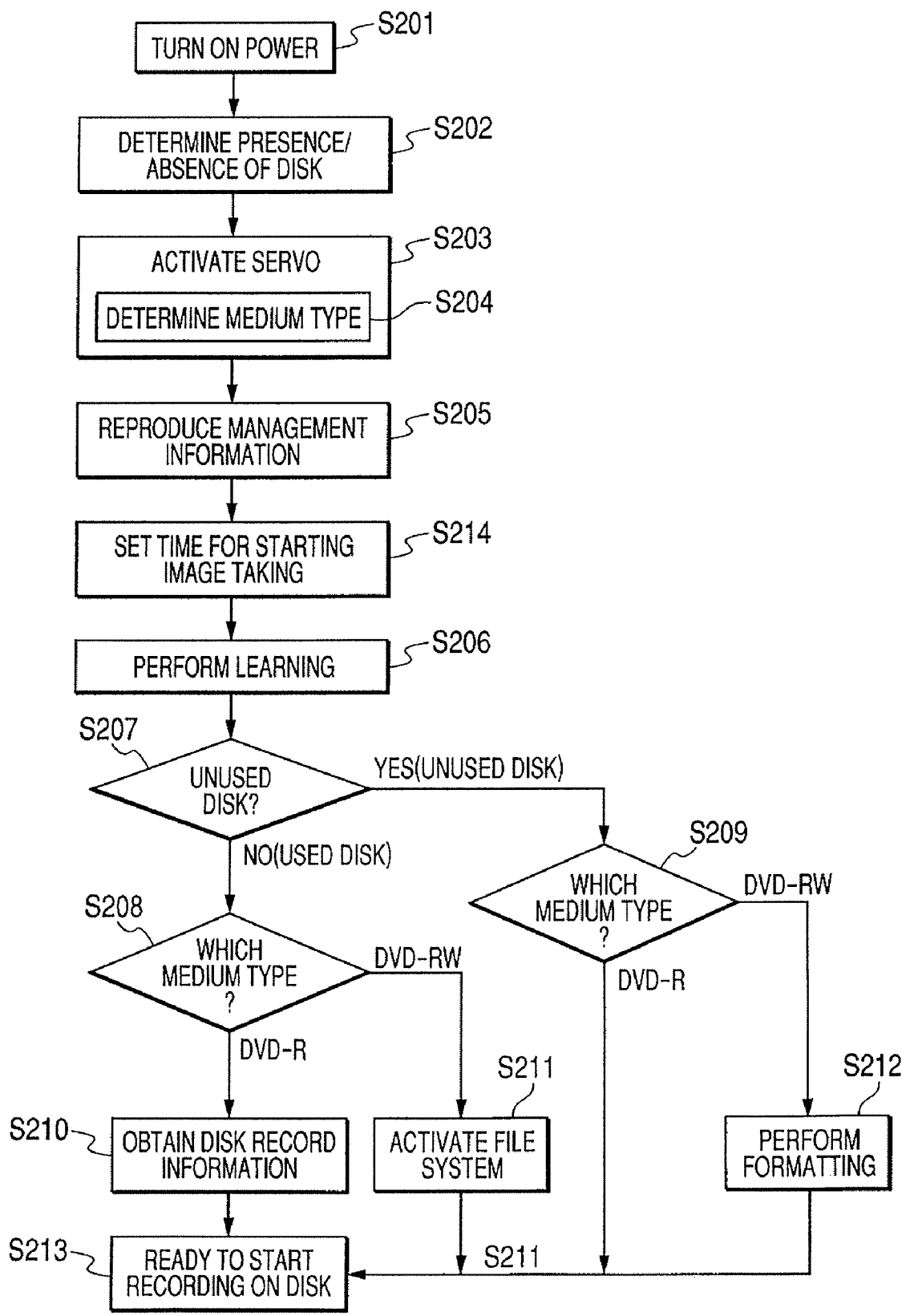
FIG. 9 is a flowchart for explaining Embodiment 2 of the present invention.

FIG. 9 shows a flowchart for explaining Embodiment 2 of the present invention. The structure of the device according to Embodiment 2 is basically the same as that of FIG. 1, and therefore a detailed explanation thereof is omitted. In Embodiment 2, the time for starting image taking is appropriately set regardless of the activation sequence which is different depending on the medium type.

First, the power is turned on in S201. In S202, it is determined whether or not the disk 120 is inserted. The way of making the determination regarding the presence or absence of the disk has been explained above with reference to FIG. 3. Next, in S203 and S204, the servo is activated and the type of medium is determined by following the same procedure as that explained above with reference to FIG. 3.

After the type of medium has been determined, the pickup 122 is moved to a track which stores the management information of the disk specified for each medium to reproduce the management information in S205. In reproducing the management information, the amplitude of the reproduced signal is monitored for a predetermined period of time from the starting position of the readout, to thereby determine whether the disk is an unused disk or not. Incidentally, while in Embodiment 1 a defect information is reproduced to determine whether the disk is an unused disk or not, in the present embodiment a management information is reproduced to determine whether the disk is an unused disk or not. The method of making the determination is the same as that of Embodiment 1.

Next, based on the determination result as to whether the disk is an unused disk or a used disk, there is set in S214 the time when image taking can be started (the timing at which image taking can be started). In the present embodiment, the time at which image taking can be started is set in accordance with the type of medium. The way of setting the time at which image taking can be started will be described later.

Then, in S206, a learning process is performed in order to obtain an optimal value for the laser power. This learning process is also the same as that described in Embodiment 1.

Next, in S207, it is determined whether the disk 120 is an unused disk or a used disk, and the process branches depending on the result of the determination. In the case of the used disk, the process proceeds to S208, while in the case of the unused disk, the process proceeds to S209.

In S208, the media type is determined based on the determination of the type of medium in S204, and the process branches according to the media type. The media type in this case refers to, as described above, a DVD-R disk or a DVD-RW disk. In the case of a DVD-R disk, an area which stores information to the recorded data area is reproduced in S210, to thereby obtain disk record information. The disk record information includes information to, for example, a head address value necessary for writing additional data. After that, in S213, the disk is made ready to start recording.

In the case of a DVD-RW disk, management information of a file system is reproduced and obtained in S211, and the disk is made ready to start recording in S213.

On the other hand, in the case where the disk is determined to be an unused disk in S207, the media type is determined in S209, and the process branches for respective media types. In this case, similarly to the above-mentioned case, the media type is determined based on the determination of the type of medium in S204.

In the case of a DVD-R disk, the disk is instantly made ready for recording in S213. In the case of a DVD-RW disk, the disk needs to be subjected to, for example, format processing of a file system in S212. Therefore, the disk 120 is made ready for recording in S213 after necessary data has been recorded on a predetermined disk area.

As described above, the time required for making the disk ready for recording may vary depending not only on whether the disk is an unused disk or a used disk but also on the type of the disk. Accordingly, the time when image taking is made possible, which enables the memory to start storage, need to be set for each disk type.

Explained next with reference to FIGS. 10A to 10E are how to set the time when image taking is made possible according to the present embodiment. Incidentally, since the process follows the same time chart as that of FIG. 5 of Embodiment 1 until the completion of the learning process, a detailed explanation therefor is omitted. The operation after the completion of the learning process is explained.

FIG. 10A shows a case of a used disk of DVD-R. The disk record information is obtained during the time period ranging from the time "t0" to the time "t1".

FIG. 10B shows a case of a used disk of DVD-RW. The file system is activated during the time period ranging from the time "t0" to the time "t2".

FIG. 10C shows a case of an unused disk of DVD-R. In this case, the disk is instantly made ready for recording immediately after the learning process.

FIG. 10D shows a case of an unused disk of DVD-RW. The disk is subjected to format processing of a file system during the time period ranging from the time "t0" to the time "t3".

For example, the times necessary for each of the above-mentioned time periods are assumed as follows:
Obtainment of disk record information: t1−t0=3 (sec)
Activating of file system: t2=t0=6 (sec)
Formatting: t3−t0=10 (sec).

Also, assuming that the memory capacity is 10 M bytes and an average transfer rate of video data is 9 Mbps, the upper limit of storage amount in the memory is reached in about 9 (sec). Therefore, in the case of using any one of the disks except for the unused disk of DVD-RW, all the data can be recorded on the disk 120 without overflowing the memory capacity as long as the image taking is started and the storage in the memory is started before the time "t0".

In the case of using the unused disk of DVD-RW, since it takes 10 (sec) for formatting, which exceeds 9 (sec) as the time for storage in the memory 108, it is necessary to start the storage in the memory 108 at an appropriate timing after the time "t0".

Therefore, as shown in FIG. 10E, the timing before the time "t0" is set as the time "ts1" at which image taking can be started for all the disks except for the unused disk of DVD-RW, while in the case of the unused disk of DVD-RW, the time "ts2" after the lapse of a predetermined time period from the time "t0" is set as the time at which image taking can be started.

As the interface through which a user is notified that image taking can be started, the LCD display portion 106 can be adopted, similarly to Embodiment 1, to display the operational status of the device. A predetermined electronic sound, voice, or the like may also be used for providing notification.

According to the present embodiment, it is possible to appropriately set the time at which image taking can be started regardless of not only whether the disk is an unused disk or a used disk but also the disk types having different activation sequences. Therefore, it is possible to start image taking before the time at which the disk is made ready for recording, thereby reducing the loss of opportunities for image taking.

Embodiment 3

Figure 11:
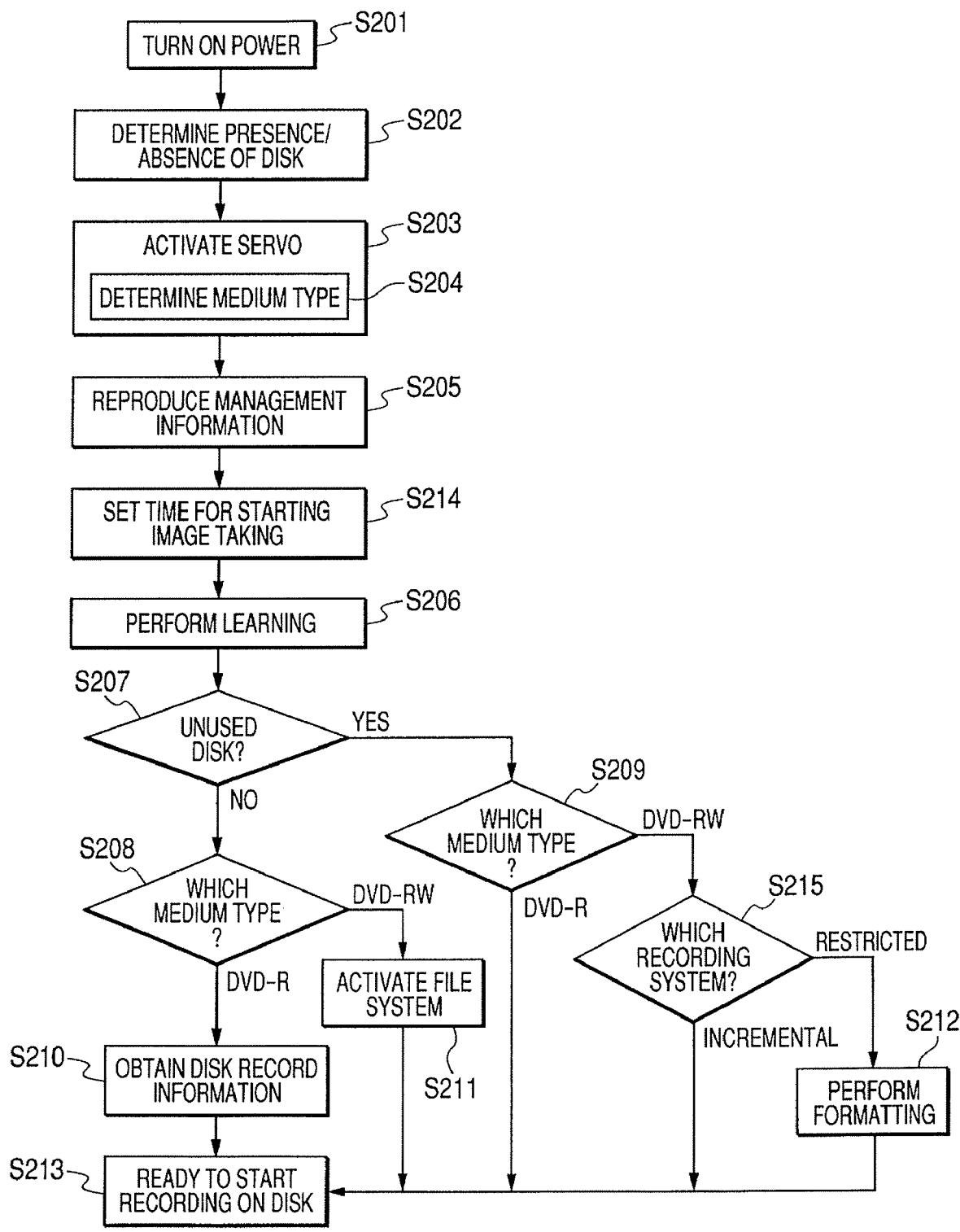
FIG. 11 is a flowchart for explaining Embodiment 3 of the present invention.

FIG. 11 shows a flowchart for explaining Embodiment 3 of the present invention. The structure of the device according to Embodiment 3 is basically the same as that of FIG. 1, and therefore, a detailed explanation thereof is omitted. In the present embodiment, the time at which image taking is made possible is appropriately set regardless of the activation sequence which differs depending on the type of medium and the recording system. In FIG. 11, the processing which is the same as that shown in FIG. 9 for Embodiment 2 is identified by like step number.

Recording systems are explained by taking a DVD as an example. In general, there are two recording systems for recording user data on a DVD. One is an incremental recording system, and the other is a restricted overwrite system. According to the incremental recording system, data are sequentially recorded. The restricted overwrite system is a system in which random access to a rewritable optical disk is possible.

In FIG. 11, first, the power is turned on in S201. In S202, it is determined whether or not the disk is inserted. Next, in S203 and S204, the servo is activated and the type of medium is determined. After the type of medium has been determined, the pickup 122 is moved to a track which stores the management information of the disk specified for each medium to reproduce the management information in S205.

When reproducing the management information, the amplitude of the reproduced signal is monitored for a predetermined period of time from the starting position of read out, to thereby determine whether the disk is an unused disk or not. The method of making this determination is the same as that of Embodiment 2.

Next, based on the determination result as to whether the disk is an unused disk or a used disk, the time at which image taking can be started (the timing at which image taking can be started) is set in S214. In the present embodiment, the time at which image taking can be started is set in accordance with the recording system of the disk.

Then, in S206, a learning process is performed in order to obtain an optimal value for the laser power or the like. This learning process is the same as that of Embodiment 1.

Next, in S207, it is determined whether the disk 120 is an unused disk or a used disk, and the process branches depending on the result of the determination. In the case of the used disk, the process proceeds to S208 in which the media type is determined, while in the case of the unused disk, the process proceeds to S209.

In S208, the process branches according to the media type. In the case of a DVD-R disk, an area storing information regarding the recorded data area is reproduced in S210, to thereby obtain disk record information. The disk record information includes information on, for example, a head address value necessary for writing additional data. After that, in S213, the disk is ready to start recording.

In the case of a DVD-RW disk, management information of a file system is reproduced and obtained in S211, and the disk is ready to start recording in S213.

On the other hand, when the disk is determined to be an unused disk in S207, the media type is determined in S209 and the process branches for each media type. In the case of a DVD-R disk, the disk is instantly made ready for recording in S213.

Meanwhile, in the case of a DVD-RW disk, the recording system is determined in S215, and the process branches depending on the result thereof. Here, it is also possible, when the process reaches S215, to display a message on the display screen for allowing a user to select a recording system such that the user can arbitrarily select the recording system. The recording system may also be selected by means of a button or the like.

In the case where the recording system is the incremental recording system, the disk is made ready for recording and the process proceeds to S213. In the case where the recording method is the restricted overwrite system, the disk is subjected to processing such as formatting and padding of a predetermined area in S212 to be made ready for recording in S213.

Explained next is how to set the time at which image taking can be started in S214. In the case of the used disk, the setting manner is the same as that of Embodiment 2, and therefore, an explanation thereof is omitted.

Here, in consideration of the setting of the time at which image taking can be started depending on the recording system, the time at which the user sets the recording system immediately before S215 is used as a reference time, and an offset time from the reference time is set in S214. In the case of the incremental recording system, the disk can be immediately made ready for recording, so that the offset time is set to "0".

Further, in the case of the restricted overwrite system, the offset time is set to "Δt" in consideration of the time necessary for the format processing of S215 and the memory capacity. In this case, the larger the free capacity of the memory, the smaller the time "Δt" can be set. The method of notifying the user of the time at which image taking can be started using the offset time includes the use of an electronic sound, voice, or a display of a message on the LCD display portion 106, similarly to the above-mentioned case.

According to the method as described above, it is possible to appropriately set the time at which image taking can be started, regardless of the process flow for image taking which differs depending not only on the media type but also on the recording system. Therefore, the user can start the image taking operation at a time prior to the time when the disk is actually made ready for recording data.

In the above-mentioned embodiments, an explanation is given on a case where the time for starting image taking is set when the power is turned on. However, the present invention is not limited to such the case, and the time for starting image taking may also be set by performing the similar processing when the disk is inserted, and may be notified to the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-332805, filed Nov. 17, 2005, which is hereby incorporated by reference herein in its entirety.

What is claimed is:

1. A digital camcorder, comprising:
   an image pickup sensor;
   a signal processing circuit for processing an output signal from the image pickup sensor;
   a memory for storing output data from the signal processing circuit;
   an optical disk drive for recording the data stored in the memory to an optical disk;
   a detection circuit for detecting whether an optical disk inserted is an unused disk or not;
   a setting circuit for setting a timing for starting image taking according to a detection result of the detection circuit; and
   a notification circuit for notifying the timing for starting image taking.

2. The digital camcorder according to claim 1, wherein the setting circuit further sets the timing for starting image taking depending on the type of the optical disk.

3. The digital camcorder according to claim 1, wherein the setting circuit further sets the timing for starting image taking depending on a recording system of the optical disk.

4. The digital camcorder according to claim 1, wherein the setting circuit sets the timing for starting image taking such that all the data stored in the memory from the beginning of the storage are recorded on the optical disk without overflow.

5. The digital camcorder according to claim 1, wherein the detection circuit reproduces information on a predetermined area of the optical disk, and detects whether the optical disk is an unused disk or a used disk based on a result of an envelope detection made on a reproduced signal obtained from the reproduction of the information.

6. The digital camcorder according to claim 5, wherein the information on the predetermined area comprises defect information or management information.

7. The digital camcorder according to claim 1, wherein the detection circuit performs ECC processing by reproducing a head position of a user data area of the optical disk, and detects whether the optical disk is an unused disk or a used disk based on a result of the ECC processing.

8. The digital camcorder according to claim 1, wherein the notification circuit notifies the timing for starting image taking by displaying a message on a liquid crystal display portion of the digital camcorder.

9. The digital camcorder according to claim 1, wherein the notification circuit notifies the timing for starting image taking by voice.

10. The digital camcorder according to claim 1, wherein the signal processing circuit comprises a video signal processing portion and a compression/decompression processing portion.

* * * * *